US007369628B2

(12) United States Patent
Haefner et al.

(10) Patent No.: US 7,369,628 B2
(45) Date of Patent: May 6, 2008

(54) METHOD FOR GAINING TIME INFORMATION AND RECEIVER FOR IMPLEMENTING THE METHOD

(75) Inventors: Horst Haefner, Heilbronn (DE); Roland Polonio, Neckarsulm (DE); Hans-Joachim Sailer, Heilbronn (DE)

(73) Assignees: ATMEL Germany GmbH, Heilbronn (DE); C-MAX Europe GmbH, Heilbronn (DE)

( * ) Notice: Subject to any disclaimer, the term of this patent is extended or adjusted under 35 U.S.C. 154(b) by 533 days.

(21) Appl. No.: 11/057,030

(22) Filed: Jan. 28, 2005

(65) Prior Publication Data

US 2005/0260958 A1 Nov. 24, 2005

(30) Foreign Application Priority Data

Jan. 29, 2004 (DE) ...................... 10 2004 004 375

(51) Int. Cl.
*H04L 27/00* (2006.01)

(52) U.S. Cl. ...................................................... 375/324

(58) Field of Classification Search ................ 375/320, 375/346, 354, 355, 356, 357, 364; 455/108, 455/355; 368/57

See application file for complete search history.

(56) References Cited

U.S. PATENT DOCUMENTS 4,440,501 A 4/1984 Schulz
4,768,178 A 8/1988 Conklin et al.
4,823,328 A 4/1989 Conklin et al.
5,105,396 A 4/1992 Ganter et al.
5,349,570 A 9/1994 Kaiser
5,528,560 A 6/1996 Ogiyama (Continued)

FOREIGN PATENT DOCUMENTS

DE 1 803 093 8/1969
DE 27 01 609 2/1978
DE 26 43 250 3/1978
DE 28 02 040 7/1979
DE 30 15 312 10/1981
DE 31 01 406 1/1983

(Continued)

OTHER PUBLICATIONS

Reinhard Kalhoefer, "Die Realisierung kompakter stoersicherer Funkuhren mit den Mitteln der Mikroelektronik" (The Realization of Compact Interference-Resistant Radio-Controlled Clocks with the Means of Microelectronics), Darmstaedter Dissertation D 17; 1980; pp. 6-19, 50-59, 100-103, 124-129; p. 17 second paragraph, p. 58 last paragraph.

(Continued)

*Primary Examiner*—Sam K. Ahn
(74) *Attorney, Agent, or Firm*—W. F. Fasse; W. G. Fasse

(57) ABSTRACT

Time signals transmitted by a time signal transmitter and received by a receiver are processed for gaining time information and for reducing demodulation errors to increase the demodulation certainty. For this purpose the following steps are performed in a time signal receiver: a) scanning of received time signals, b) storing of scanned values of the time signal, c) detecting from the scanned and stored values an amplitude change in said time signal, d) measuring the duration of any detected amplitude changes, e) evaluating the measured time durations relative to a predetermined time duration (Δt) and f) excluding from further processing amplitude changes that have a measured duration that is shorter than the predetermined duration. Amplitude changes of longer duration than (Δt) are demodulated and further processed. The receiver circuit is equipped to perform the foregoing steps, particularly in a radio-controlled clock.

27 Claims, 3 Drawing Sheets

U.S. PATENT DOCUMENTS

| | | | | |
|---|---|---|---|---|
| 5,727,022 | A | 3/1998 | Schaefer et al. | |
| 5,805,647 | A | 9/1998 | Schaefer et al. | |
| 5,818,851 | A | 10/1998 | Memmler | |
| 2003/0117901 | A1 | 6/2003 | Takada et al. | |
| 2003/0189876 | A1 | 10/2003 | Chan | |
| 2005/0036514 | A1 | 2/2005 | Polonio et al. | |
| 2005/0116856 | A1 | 6/2005 | Haefner et al. | |
| 2005/0122951 | A1 | 6/2005 | Kuehnle et al. | |
| 2005/0122952 | A1 | 6/2005 | Haefner et al. | |
| 2005/0129156 | A1* | 6/2005 | Lourens et al. | 375/350 |
| 2005/0141648 | A1* | 6/2005 | Lourens et al. | 375/340 |
| 2005/0147080 | A1 | 7/2005 | Haefner et al. | |
| 2005/0169230 | A1 | 8/2005 | Haefner | |
| 2005/0175039 | A1 | 8/2005 | Haefner et al. | |
| 2005/0202796 | A1 | 9/2005 | Haefner et al. | |

FOREIGN PATENT DOCUMENTS

| | | |
|---|---|---|
| DE | 32 36 162 | 4/1984 |
| DE | 33 46 091 | 7/1985 |
| DE | 35 04 338 | 8/1986 |
| DE | 35 16 810 | 11/1986 |
| DE | 37 19 650 | 12/1988 |
| DE | 37 33 965 | 4/1989 |
| DE | 37 33 966 | 4/1989 |
| DE | 42 37 112 | 5/1993 |
| DE | 43 04 321 | 8/1993 |
| DE | 43 19 946 | 12/1993 |
| DE | 42 27 502 | 3/1994 |
| DE | 42 33 126 | 4/1994 |
| DE | 93 00 945 | 5/1994 |
| DE | 42 42 384 | 6/1994 |
| DE | 43 32 798 | 3/1995 |
| DE | 44 03 124 | 8/1995 |
| DE | 44 12 892 | 10/1995 |
| DE | 44 42 818 | 6/1996 |
| DE | 195 14 031 | 10/1996 |
| DE | 195 14 036 | 10/1996 |
| DE | 195 40 592 | 5/1997 |
| DE | 198 08 431 | 9/1999 |
| DE | 298 13 498 | 12/1999 |
| EP | 0 042 913 | 1/1982 |
| EP | 0 201 061 | 11/1986 |
| EP | 03 05 200 | 3/1989 |
| EP | 1 079 554 | 2/2001 |
| EP | 1 316 861 | 6/2003 |
| JP | 11-030677 | 2/1999 |
| JP | 2002-286877 | 10/2002 |
| JP | 2003-125012 | 4/2003 |
| WO | WO2004/036742 | 4/2004 |

OTHER PUBLICATIONS

Wolfgang Hilberg, "Funkuhren" (Radio-Controlled Clocks); R. Oldenbourg Publishers, Munich, Federal Republic of Germany; Jan. 1983; ISBN 3-486-27341-8; pp. 219-234; p. 230 last paragraph.

Michael Arnoldt, "Zeitzeichen- und Normalfrequenzempfang (Time Signal and Normal Frequency Reception)"; Franzis', Munich, Federal Republic of Germany; Jun. 1987; ISBN 3-7723-8171-5; pp. 29-41, 97, 124-161; p. 39 last paragraph Section 1.4.5; p. 40 section 1.4.6.

"Die erste Funkuhr am Handgelenk (The First Radio-Controlled Watch on the Wrist)", article in magazine Funkschau 15/1990, pp. 52, 53.

Peter Hetzel, "Time Information and Normal Frequency" (Zeitinformation und Normalfrequenz), Telekom Praxis, vol. 1, 1993, pp. 25 to 36.

* cited by examiner

METHOD FOR GAINING TIME INFORMATION AND RECEIVER FOR IMPLEMENTING THE METHOD

CROSS-REFERENCE TO RELATED APPLICATION

This application is related to U.S. Application 11/045,441 filed on Jan. 28, 2005. The entire disclosure of the related application is incorporated herein by reference.

PRIORITY CLAIM

This application is based on and claims the priority under 35 U.S.C. §119 of German Patent Application 10 2004 004 375.2, filed on Jan. 29, 2004, the entire disclosure of which is incorporated herein by reference.

FIELD OF THE INVENTION

Time information is retrieved from received amplitude modulated time signals transmitted by a time signal transmitter. The received information is used to operate a radio-controlled clock or a receiver circuit of such a clock.

BACKGROUND INFORMATION

The radio-controlled transmission of time information is performed by transmitting so-called time signals by respective transmitters referred to herein as time signal transmitters or simply transmitter. The term "time signal" is intended to mean a transmitter signal of short duration for providing time information in the form of a time reference provided by the transmitter. The time reference is a modulated oscillation generally comprising several time markers which, upon demodulation, merely are an impulse which reproduces the transmitted time reference with a determined uncertainty or inaccuracy.

The German long wave time signal transmitter station DCF-77 transmits, in a continuous operation controlled by atomic clocks, amplitude modulated long wave time signals in accordance with the official atomic time scale CET (Central European Time) with a transmitter power of 50 kW at a frequency of 77.5 kHz. Similar time signal transmitters exist in other countries for the transmission of time information on a long wave carrier frequency in the range between 40 to 120 kHz. All countries using such transmitters transmit the time information as a telegram having a duration of exactly 1 minute.

FIG. 1 shows an encoding scheme A referred to as a telegram. This telegram A represents the encoded time information transmitted by the German time signal transmitter DCF-77. The encoding scheme or telegram A comprises 59 bits, whereby one bit corresponds to one second of a time frame. Thus, within the duration of 1 minute a so-called time signal telegram can be transmitted. This telegram comprises binary encoded information, particularly information regarding time and date. The first fifteen bits B comprise a general encoding which, for example, may contain operational information. The next 5 bits C contain general information. Thus, the letter R designates the antenna bit. A1 designates an announcement bit for the transition from the Central European Time (CET) to a Central European Summer Time (CEST) and back again. Bits Z1 and Z2 designate time zone bits. Bit A2 designates an announcement bit for a leap second and bit S designates a start bit for the beginning of the encoded time information. Starting with bit 21 and up to bit 59 these bits transmit the time and data information with a BCD code, whereby the data are respectively relevant for the next following minute. The bits in the area D contain information regarding the minute. The bits in the area E contain information regarding the hour. The bits in the area F contain information regarding the calendar day or date. The bits in the area G contain information regarding the day of the week. The bits in the area H contain information regarding the month. The bits in the area I contain information regarding the calendar year. These informations are provided in a bit-by-bit fashion in an encoded form. So-called testing bits P1, P2, P3 are provided respectively at the ends of the areas D, E and I. The sixtieth bit of the telegram is not designated and serves for indicating the beginning of the next time frame. The letter M designates the minute marker and thus the beginning of a time signal telegram.

The structure and the bit allocation of the encoding scheme or telegram A of FIG. 1 for transmitting of time signals is generally known and described, for example in an article by Peter Hetzel, "Time Information and Normal Frequency" in the Publication "Telecom Practice", Vol. 1, 1993.

The time signal information is transmitted with the aid of individual second markers amplitude modulated onto a carrier. The modulation comprises a reduction X1, X2 or an increase of the carrier signal X at the beginning of each second. In the case of the German time signal transmitter DCF-77 the transmitted time signals are modulated onto the carrier amplitude at the beginning of each second, with the exception of the fifty-ninth second, within each minute. For example, reducing the carrier amplitude for 0.1 second represents X1, reducing the carrier amplitude for 0.2 seconds represents X2. The amplitude reduction amounts to about 25% down from the amplitude peak. These amplitude reductions X1, X2 of different time durations define respective second markers or data bits in encoded form which are decoded in a time signal receiver. These different time durations of the second markers serve for the binary encoding of the clock time and date. Second markers X1 of a duration of 0.1 seconds correspond to the binary "O" and time markers X2 with a duration of 0.2 seconds correspond to the binary "1". The absence of the sixtieth second marker announces the next following minute marker. An evaluation of the time information transmitted by the time signal transmitter may then be performed in combination with the respective second.

FIG. 2 illustrates a portion of an example of an amplitude modulated time signal. However, the evaluation of the precise time and the precise date is only possible if the fifty-nine second bits of a minute are recognized unambiguously so that a logic "0" or a logic "1" may be allocated to each of these respective second markers.

Frequently, noise signals are superimposed on received time signals which causes a problem because noise signals may disturb the time signal accuracy. Noise signals may, for example, be generated by electromagnetic radiations emanating from electric and electronic equipment present in the transmission range between a time signal transmitter and a time signal receiver. Even electrical components within the time signal receiver itself may cause noise. If the noise impulses are present within the range of a second impulse, such noise signals may cause a short duration increase in the signal level of the time signal. In order to demodulate the time signals including noise signals superimposed on the time signals the latter are scanned and converted into discrete values of a digital signal. This digital signal has a low logic level when the amplitude of the time signal is reduced. The signal has a high logic level corresponding to the nominal level when the amplitude is not reduced. If the duration of a noise impulse and thus of a corresponding amplitude change in the time signal is within the range of the duration of a scanning frequency cycle, then short duration fluctuations occur in the demodulated time signal. These fluctuations which are typically substantially shorter than the second impulses that are provided or predetermined by the telegram of the time signal. Problems occur, when time signals with such fluctuations are decoded. As a result, an increased computer effort and expense is necessary for gaining the time information and for evaluating the gained information in order to be able to distinguish between amplitude reductions determined by the time protocol of the time signal on the one hand and noise caused amplitude changes such as reductions on the other hand.

Another problem is seen in the fact that conventional receivers for radio-controlled clocks have a tendency to switch over too early to the nominal signal level of the time signal when the second impulses are very long. Such premature switch-over is undesirable since the second impulse or the respective amplitude reduction of the time signal is not yet completed.

The two above mentioned problems lead to a falsification of the duration of a second impulse or rather of the respective amplitude reduction of the time signals that needs to be evaluated. However, second impulses that are not falsified are absolutely necessary for a proper decoding of the information contained in the time signal. Falsified second impulses can lead to a faulty decoding of the time signal which means that at least one data bit of the minute protocol has been incorrectly evaluated. As a result, the time derived from the time signal would not be correct anymore.

The following references provide a general background information for radio-controlled clocks and receiver circuits for receiving time signals. These references are: DE 198 08 431 A1, DE 43 19 946 A1, DE 43 04 321 C2, DE 42 37 112 A1 and DE 42 33 126 A1. With regard to information retrieving and information processing of time information from time signals, reference is made to the following German Patent Publications DE 195 14 031 C2, DE 37 33 965 C2, and EP 042,913 B1.

OBJECTS OF THE INVENTION

In view of the above it is the aim of the invention to achieve the following objects singly or in combination:

- to assure a certain and correct decoding of the information encoded in a received time signal;
- to reduce the error frequency during decoding, which error frequency is caused by second impulses falsified by noise signals;
- to provide a receiver circuit arrangement capable of performing the steps required for the elimination of falsified second impulses from further processing; and
- to exclude from further processing those amplitude changes of a time signal which have a duration shorter than a predetermined duration to thereby eliminate the effect of falsifying noise signals.

The invention further aims to avoid or overcome the disadvantages of the prior art, and to achieve additional advantages, as apparent from the present specification. The attainment of these objects is, however, not a required limitation of the claimed invention.

SUMMARY OF THE INVENTION

The above objects have been achieved according to the invention in a method for gaining time information from received amplitude modulated time signals which are made up of a multitude of time frames, each having a constant duration, wherein the following steps are performed:

a) scanning a received time signal to obtain scanned values;

b) storing the scanned values of the time signal;

c) detecting an amplitude change .of the time signal on the basis of the stored scanned values;

d) measuring the duration of the detected amplitude change; and e) evaluating the measured time duration, whereby the detected amplitude change is excluded from the following demodulation provided that the measured time duration is smaller than a predetermined time duration (Δt). The predetermined time duration (Δt) may correspond to a count of a counter or to a predetermined number of scanned values that can be scanned in the predetermined time duration (Δt).

A circuit arrangement for a radio-controlled clock or a radio-controlled clock equipped with a circuit arrangement capable of performing the above steps is characterized by the following: a scanner for scanning the received time signals to obtain scanned values, a first evaluating unit for detecting a change, such as an amplitude change, in the scanned values of the time signal, a counter for counting the cycles of a reference signal to provide a count signal as a measure for the duration of a detected signal change such as an amplitude change, and a second evaluating unit or section which evaluates the count signal in order to exclude the time signal from further processing or further demodulation provided that the measured duration of the time signal is smaller or shorter than a predetermined duration (Δt).

The present invention is based on the following recognition. Each time frame of a received time signal has an exact constant time duration, whereby maximally one amplitude change of the received time signal is present at the beginning or end of any time frame. The duration of this change defines the value of the respective data bit allocated to the respective time frame. The basic changes that are possible within a time signal have respective specific durations which are predetermined by the protocol of the transmitted time signal. The duration of such a change corresponds preferably to at least 100 msec. The time signal is periodically scanned prior to its digital evaluation. The scanned values, each of which has a discrete value, are stored temporarily in a memory.

The basic concept of the present invention is seen in that during the demodulation an amplitude change in the demodulated time signal is taken into account only when a predetermined number of scanning values has assumed a new level. This predetermined number of scanned values defines a predetermined time duration (Δt) during which amplitude changes are not taken into account in the demodulated time signal. The predetermined number of the evaluated scanned values or the respective time duration depends on the protocol and/or on the telegram of the respective transmitted time signal because in the different protocols the respective amplitude changes or the second impulses may have differing time durations. Thus, the number of the evaluated scanned values depends particularly on the shortest duration of an amplitude change of a respective received time signal. According to the invention all amplitude changes, depending on the time signal telegram, are ignored, which are shorter in duration than the predetermined time duration or shorter than the duration of a predetermined number of scanning values.

It is a special advantage of the invention that the present time signal receiver and thus any radio-controlled clock has a larger system sensitivity because classic, typically very short noise impulses are effectively gated out or filtered out. Noise signals that, based on experience, occur frequently, can now be filtered out selectively and are thus prevented from contributing to an erroneous signal interpretation.

According to the invention the demodulated time signal particularly in the area of a second impulse, is now superimposed by significantly fewer noise signal components which assures a reliable decoding. Further, falsifications of the date bits lengths or durations which, in the worst case scenario, can lead to an erroneous decoding of the respective data bit, are significantly reduced. This features leads to an overall improved sensitivity of the receiver for a radio-controlled clock and thus to a better system sensitivity.

The present method can be implemented either by hardware or by software, which means that it can be realized in the most different receiver arrangements for radio-controlled clocks. The circuit according to the invention is also easily implemented by at least one memory, a counter stepped up or down by a reference clock signal and at least one evaluating unit. Due to its simplicity the present method and the respective circuit arrangement can be effectively yet economically implemented.

According to the invention the following step sequence is performed. The time signal is scanned, scanned values are intermediately stored, scanned values are read-out in the same sequence as they have been stored, and two neighboring scanned values are compared. No difference indicates no amplitude change. A difference indicates an amplitude change. A difference may be due to an amplitude change required for encoding the second impulse or impulses of the time signal. Alternatively, a difference may be due to a noise signal which is to be gated out so that the time signal will not show an amplitude change at this point of time. In order to distinguish between changes caused by encoding and those caused by noise, the durations of these changes are measured. One way of measuring the duration is by starting counting clock signal pulses with the start of a change and stop the counting when the change stops. Alternatively, these durations may be derived from a number of scanned values allocated to a detected amplitude change because each scanning step has a defined time duration. The evaluation unit compares the measured time duration with a predetermined duration (Δt). If the measured duration is shorter than (Δt), the respective change is gated out and not demodulated. If the measured duration is longer than (Δt) the longer duration amplitude change is demodulated and subsequently decoded by determining and evaluating the respective duration of a second impulse. The result is a time signal free of noise.

According to an advantageous embodiment of the invention, different telegrams of different time signal transmitters or the respective protocols may be stored in a memory, which may be separate from the memory for storing scanned values. These different telegrams or protocols may be stored for example in the form of a look-up table. The look-up table memory may be part of the radio-controlled clock or part of the clock's receiver. Additionally or alternatively, such telegrams or protocols may be implemented as hardware logic, for example in a PLD circuit or in an FPGA circuit. The predetermined time duration (Δt) or the predetermined number of scanning values will depend from the telegram of the respective received time signal.

It is preferred to determine the predetermined time duration (Δt) or the predetermined number of scanning values with reference to the shortest time duration that is determined by the telegram or encoding, particularly with reference to the shortest second impulse of the time signal. In this connection the duration of a preselected number of scanning values should be less than 50% of the shortest amplitude change as determined by the respective encoding protocol. Preferably, the maximum duration should be 25% of the shortest duration amplitude change that is part of the encoding. As an example, the protocol of the United States time signal transmitter WWVB comprises three different second impulse durations of 200 msec, 500 msec, and 800 msec. Thus, according to the invention all amplitude changes having a duration shorter than 100 msec should be gated out, particularly changes shorter than 50 msec should be gated out from the time signals received from WWVB. Similar considerations apply to other time signal transmitters, for example the German transmitter DCF-77 which transmits second impulses having a duration of 100 msec and 200 msec. Accordingly, change durations of 50 msec or 25 msec should be gated out or filtered out. Thus, these short duration changes will not be part of the demodulation.

Selecting predetermined time durations (Δt) of 50 msec, particularly 25 msec, is based on the recognition that the smallest time duration of an encoding change transmitted by most time signal transmitters is minimally 100 msec. Moreover, the duration of most noise caused changes are typically of a duration of less than 50 msec or 25 msec and thus fall into the range which, according to the invention is not to be considered for demodulation and should be filtered out.

Summarizing the foregoing, short duration amplitude changes below a predetermined duration threshold value are excluded from the demodulation while amplitude changes of longer durations above the threshold value are demodulated. As a result, there may be missing scanning values. However, such missing scanning values may be replaced, for example by using the latest scanning values prior to the latest amplitude change.

The time information is available in the time signal in a bitwise manner. A value of a respective data bit is obtained on the basis of the allocated telegram of the time signal transmitter from a duration of an amplitude change of the transmitted time signal. A logic binary value is allocated to each respective data bit. The logic binary value is derived from the duration of the amplitude change. A first duration of the amplitude change of the time signal designates a first logical value of the data bit. A second duration designates a corresponding second logic value of the data bit. The first and second time durations are predetermined by the respective telegram of the time signal transmitter. Typically, the first logic value designates or corresponds to a logic “0” indicating a low voltage level while the second logic value designates a logic “1” corresponding to a high voltage level. These logic designations can be reversed if desired.

A change in most telegrams of a time signal transmitted by time signal transmitter generally designates an amplitude reduction of the time signal. However, a change in the form of an amplitude increase can be equally expressed by a reverse logic.

According to a further advantageous embodiment it is useful to apply the present method not only where an amplitude reduction takes place as a transition from a high logic level to a low logic level but also where the change is a transition from a low logic level to a high logic level.

It is useful to select different threshold values (Δt) for amplitude changes due to a transition from a high logic level to a low logic level and other threshold values (Δt) for amplitude changes due to a transition from a low logic level to a high logic level. This selection of different threshold values is based on the recognition that in case of a transition from a low logic level to a high logic level as occurs, for example in the United States time signal transmitter WWVB, a larger number of scanning values are required for scanning a change in the amplitude than is necessary when the amplitude change is a reduction. The need for more scanning values is due to the fact that most known time signal receivers have a tendency to generate so-called spikes in response to an amplitude change phase of longer duration. Stated differently, the receivers have a tendency to switch back to the high logic level when the amplitude change takes too long. If these spikes occur frequently, the respective evaluating unit could interpret the spikes already as an amplitude change of the time signal and thus switch over too early to the high logic level. The present invention prevents such receiver tendencies, thereby more effectively preventing erroneous interpretations.

According to the invention it is also possible to select individual threshold values (Δt) for individual time signal telegrams. Thus, the predetermined duration (Δt) may differ for different time telegrams, whereby the respective number of scanned values will also differ accordingly. The concept, however, remains the same that amplitude changes having a duration below the threshold value will be eliminated while amplitude changes of a duration above the threshold value will be demodulated.

The reference clock signal for providing a time count is produced by a reference clock signal generator having a predetermined clock signal frequency. Preferably, the generator is the quarts that is part of the radio-controlled clock.

The present receiver circuit arrangement comprises a memory having such a storage capacity that at least a portion of the scanned values required for the demodulation can be stored. The memory may be implemented on a software basis or on a hardware basis. Basically, any memory can be used, however, a high integration semiconductor memory such as RAM, ROM, SRAM, SDRAM, and so forth are preferred. The memory functions as a buffer for the scanned values. Thus, the storage capacity should be so determined that at least that number of scanned values may be temporarily stored which is minimally required to correspond to the predetermined time duration (Δt), more specifically the storage capacity must be sufficient to store the predetermined number of scanned values.

The functions to be performed by the evaluating unit according to the invention and/or to be performed by the counter may be advantageously realized by a hardwired logic circuit. Such logic circuit may, for example, include an FPGA circuit or a PLD circuit (FPGA=Field Programmable Gate Array, PLD=Programmable Logical Device). Basically, these functions may also be performed by a micro-controller typically forming part of a radio-controlled clock. However, implementing the present circuit separately has the advantage that the micro-controller's capacity does not need to be increased. Moreover, gating out the amplitude changes caused by a noise signal, can be realized by a logic circuit in a very simple manner. Thus, the micro-controller is still available for other purposes such as the evaluation of the time signal as well as functions that are required by a particular user of a radio-controlled clock.

In a preferred embodiment, the evaluation unit and the memory are preferably part of the demodulator which demodulates the received time signal.

BRIEF DESCRIPTION OF THE DRAWINGS

In order that the invention may be clearly understood, it will now be described in connection with example embodiments thereof, with reference to the accompanying drawings, wherein.

Figure 1:
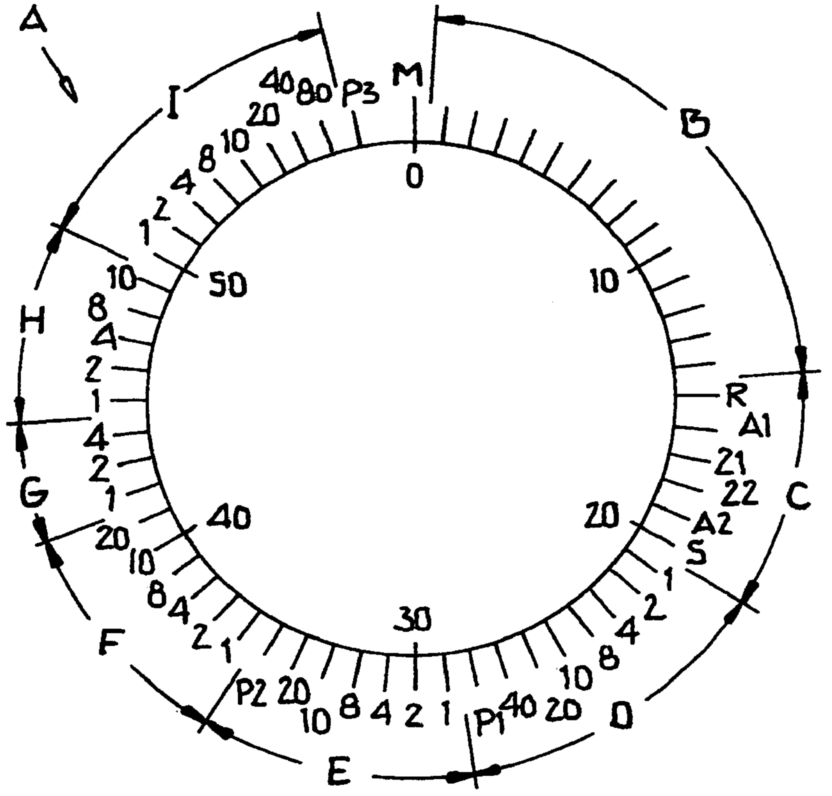
FIG. 1 illustrates a time signal telegram or encoding scheme, for example of the German time signal transmitter DCF-77 which transmits encoded time information.
Figure 2:
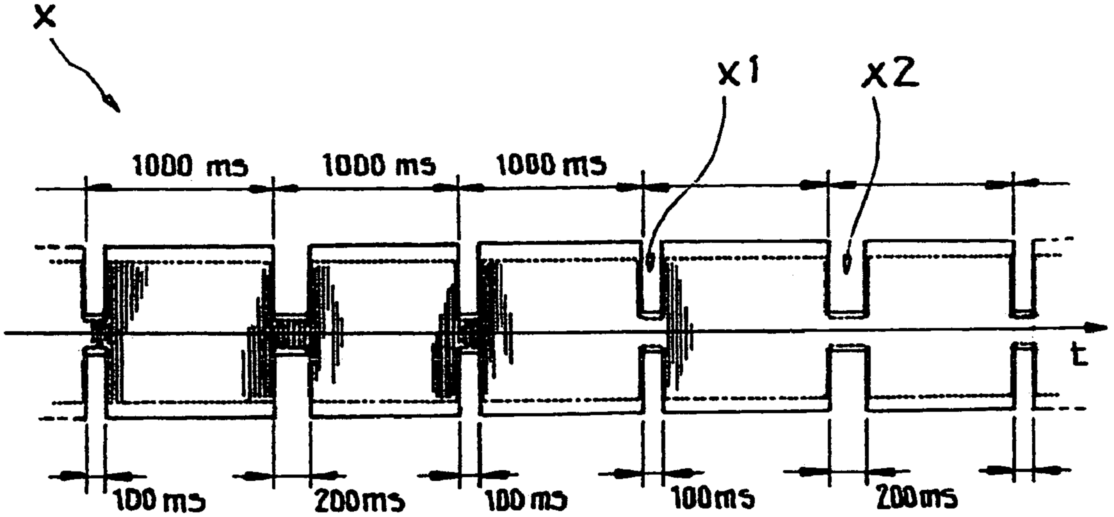
FIG. 2 shows a portion of five second markers of an amplitude modulated time signal transmitted without disturbances by the DCF-77 transmitter.

DETAILED DESCRIPTION OF A PREFERRED EXAMPLE EMBODIMENT AND OF THE BEST MODE OF THE INVENTION

In the drawings all structurally or functionally equivalent elements and signals are designated with the same reference characters unless otherwise indicated.

Figure 3:
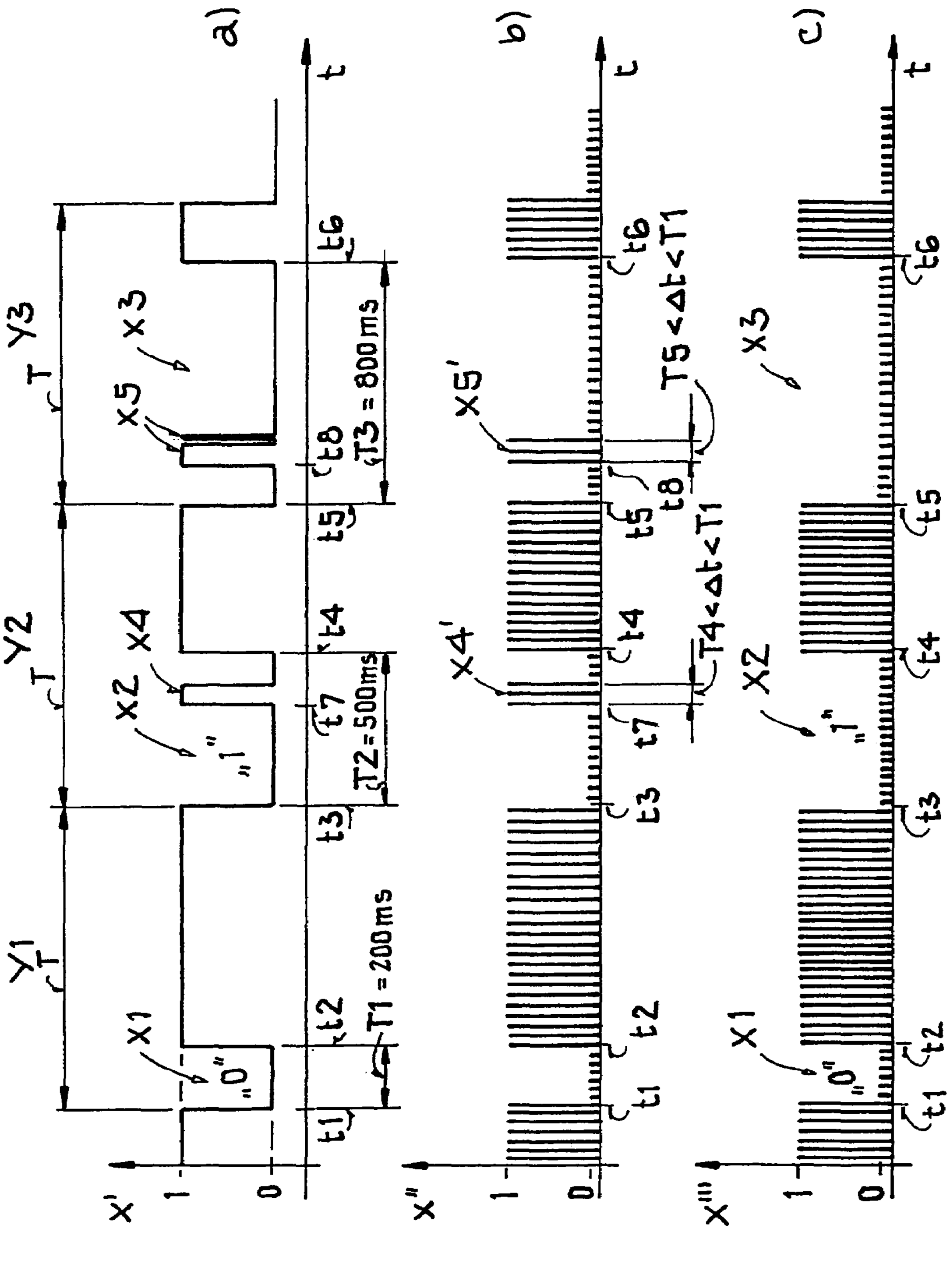
FIG. 3 illustrates portion of a time signal transmitted by the United States transmitter WWVB, for explaining the present invention with reference to this time signal.

FIG. 3 shows a portion of a time signal transmitted by the United States time signal transmitter WWVB. This time signal diagram is used for explaining the invention. It should be noted that the illustration of FIG. 3 is not suitable for reproducing a special encoding. FIG. 3 is merely shown as an example. Further, the scale along the time axis t has been enlarged to provide a better overview.

The sections of FIG. 3 show three complete time frames Y1 to Y3 of the time signal X. The duration of each time frame Y1 to Y3 corresponds exactly to t=1000 msec. The time signal X transmitted by the transmitter WWVB comprises three different second impulses for the binary encoding. The respective amplitude changes are amplitude reductions X1 having a duration of t1=200 msec, X2 having a duration of t2=500 msec and X3 having a duration of t3=800 msec. Respective points of time t1, t3, t5 define the beginning of the amplitude changes X1, X2, X3. Points of time t2, t4, t6 designate the termination of the changes X1, X2, X3. The first amplitude reductions X1 correspond to the binary "0" and the second amplitude reductions X2 correspond to the binary "1", whereby one binary "1" and one binary "0" together form a data bit. The third amplitude reductions X3 occur in the telegram of the WWVB transmitter respectively at the beginning of a minute protocol.

In order to ascertain amplitude changes X4, X5 caused by noise signals, the present method is applied. It is assumed that short duration amplitude changes which are shorter than a predetermined duration Δt<t1 are not to be further processed. Accordingly, these short duration changes are to be gated out. It is further assumed that the received time signal is superimposed by a noise impulse X4, X5 in the second and third amplitude reduction X2, X3. The durations of the noise impulses X4, X5 are respectively shorter than the predetermined duration Δt. The first noise signal X4 begins at point of time t7. The second noise signal X5 begins at point of time t8.

Following the scanning of the time signal, the scanned signal X" has scanned values with a high logic level ("1") in the area of the nominal level of the time signal X. In the area of amplitude changes X1 to X3, the scanned values have a low logic level ("0"). The noise signals X4, X5 have the effect that the scanned signal X" starting with the points of time t7 and t8 have scanned values with a high logic level ("1") for the durations T4 and T5.

The durations T4, T5 of an amplitude change X4 X5 caused by a noise signal are measured by counting the impulses or cycles of a reference clock signal Clk which has a precise known reference frequency. Thus, the resulting count signal 18 is a measure for the actual duration of an amplitude change of the time signal X. When the durations T4, T5 exceed the predetermined time duration Δt, then the evaluating unit 20 interprets this fact to the effect that the change was not caused by a noise signal. However, when the durations T4, T5 are shorter than the predetermined duration Δt then the evaluating unit 20 interprets this fact to the effect that the changes X4, X5 were caused by a noise signal. In the present case as shown in FIG. 3, both changes X4' and X5' were caused by a noise signal because both durations T4 and T5 are shorter than the predetermined time duration Δt. Therefore, both changes are gated out and not used. Rather, the evaluating unit now generates scanned values X''' which eliminates the disturbances X4' and X5'.

Figure 4:
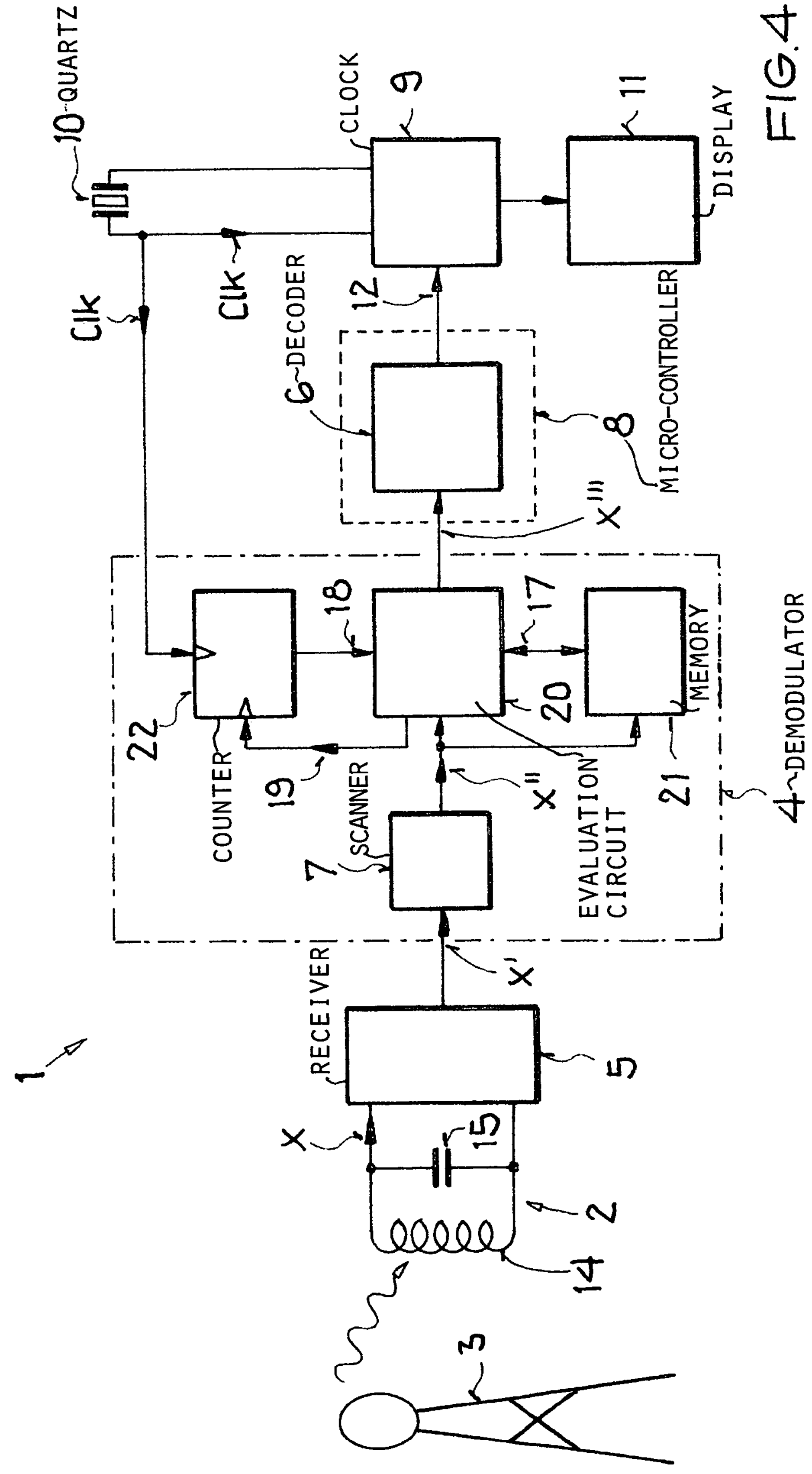
FIG. 4 is a simplified block circuit diagram of the present gating circuit arrangement of a receiver for a radio-controlled clock for implementing the present method.

FIG. 4 shows a block circuit arrangement of a receiver circuit according to the invention for implementing the present method. A radio-controlled clock 1 comprises as part of its receiver 5 one or more antennas 2 for receiving the time signal X transmitted by the time signal transmitter 3. For example, the antenna 2 comprises an inductance coil 14 with a ferrite core connected in parallel to a capacitor 15. The receiver 5 comprises, for example, several filters such as bandpass filters, a rectifier circuit, and at least one amplifier for processing the received time signal X. Circuits represented by block 5 are well known.

The output signal X' of the receiver 5 is supplied to a demodulator 4, the input of which is formed by a scanner 7 which produces at its output scanned signals X" for further processing in the demodulator 4 to produce a demodulated signal X''' supplied to the input of a decoder 6 forming part of a micro-controller 8. The decoder 6 provides an output signal 12 that is supplied to the electronic clock 9 provided with a display 11 for displaying the time information.

In practice the demodulator circuit 4 and the decoding circuit 6 can be part of the receiver or, as shown, they may be separate components. The micro-controller 8 is program controlled and, in the case of a radio-controlled clock it is a four-bit controller suitable to process the demodulator output signal X''' to provide an exact time information and an exact date represented by the signal 12. The clock 9 is an electronic clock controlled by a quartz 10. The signal 12 causes the clock 9 to properly correct the displayed time and date.

The demodulator 4 comprises, according to the invention, the above mentioned scanner 7 connected to the output of the receiver 5 to produce from the receiver output signal X' the scanned signals X" each having a discrete value. An evaluating circuit 20 and a memory 21 are also part of the present demodulator 4. The scanned values X" are initially stored in a portion or section of the memory 21 and also supplied to the evaluating circuit 20 which can, as needed, read out the scanned values X" from the memory 21 as indicated by the connection 17.

The demodulator 4 further comprises a counter 22 which counts clock impulses provided by the clock signal Clk generated by the clock signal generator 10 which is preferably the quartz 10 forming part of the electronic clock 9. The counter 22 has a control input 19 to receive a control signal from the evaluating unit 20. More specifically, the counter 22, for example an up-counter, begins counting at the beginning of an amplitude change and stops counting at the end of an amplitude change, thereby measuring the time duration of that amplitude change of the time signal X. Thus, the logic values of the scanned signals "high" or "low" control the counter and thus the time measurement. Instead of using an up-counter, a down counter could be used for counting the clock impulses Clk.

The evaluating unit 20 continuously reads out the scanned values through the connection 17. Timewise neighboring values are compared with each other to see whether they are equal to or whether they differ from one another. If two neighboring scanned values differ from each other, then there is a change in the signal level of the received time signal X'. This change can either be caused by a noise signal or it may be part of the encoding of the second impulse. In order to distinguish these two possibilities, the counter 22 is first reset by a respective control signal supplied to the control input 19 of the counter 22. Starting with the reset the counter 22 keeps counting the impulses of the reference signal Clk. The actual count or count signal 18 is supplied to a respective input of the evaluating unit 20. The count signal 18 is a measure for the actual duration of a change in the scanned values or scanned time signals X". The evaluating unit 20 now compares the time count with a predetermined time duration Δt for distinguishing between a noise signal and an encoding signal. The former are ignored while the latter are further processed. The evaluating unit now generates on its part scanned values in such a way that at the evaluated time position no amplitude change is present in the time signal, thereby eliminating noise components in the output signal X''' which is supplied to the decoder 6.

The demodulator 4 and/or the receiver 5 are preferably a part of a logic circuit, particularly a hardwired logic circuit. Thus, these logic circuits relieve the micro-controller 8 so that it is available for its intended purpose and other purposes without the need for a more powerful micro-processor.

As described above, the evaluating unit 20 performs two functions, namely to detect a change in the time signal on the one hand, and to evaluate the count signal 18. These two functions may be performed by two separate evaluating circuits or by one evaluating circuit constructed to perform both functions. Similarly, the memory performs two functions, namely storing the scanned values necessary for the demodulation of the time signal and also storing time signal telegrams of different time signal transmitters, for example, in the form of a table. Here again separate memories may be used or a single memory having the required storage capacity may be used.

Although the invention has been described above with reference to preferred example embodiments, the invention is not limited thereto, but can be modified in many ways. Particularly, the invention is not limited to the above indicated numbers which are merely examples. It is to be understood that the disclosed concrete circuit arrangement is one possible variant of an example embodiment of a receiver circuit which can be modified by exchanging simple structural components or functional units of the present receiver circuit arrangement. Further, the invention is not limited to the disclosed time signal transmitters. These transmitters were merely used for providing a better understanding of the invention without limiting the invention in this respect. In this context the term "radio-controlled clock" includes clocks that receive the time signals by wire, for example as is customary in clock systems that are built in and have the above described structure.

The above description refers to an encoding that is realized by a reduction in the carrier signal at the beginning of a time frame. It is to be understood that such encoding can also be realized by an increase of the carrier signal amplitude or generally by changing the amplitude of the carrier signal.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method for gaining time information from received, amplitude modulated time signals (X) including a plurality of time frames (T) of constant duration, said method comprising the following steps:

a) scanning said received amplitude modulated time signals (X) to provide scanned values (X"), b) storing in a storing sequence said scanned values in a memory to provide stored scanned values, c) detecting from said stored scanned values amplitude changes (X4, X5) in said time signal (X), d) measuring time durations (T4, T5) of said amplitude changes (X4, X5), e) comparing said time durations (T4, T5) with a predetermined time duration (Δt) for distinguishing between first amplitude changes having a duration shorter than said predetermined time duration (Δt) and second amplitude changes having a duration longer than said predetermined time duration (Δt), and f) demodulating said second longer amplitude changes while excluding from demodulating said first shorter amplitude changes.

2. The method of claim 1, wherein said detecting step c) is performed by carrying out the following substeps:

c1) reading out said stored scanned values in a read-out sequence that is the same as said storing sequence, c2) comparing neighboring in time scanned values, and c3) and detecting an amplitude change (X4, X5) only in response to a difference between two neighboring in time scanned values.

3. The method of claim 1, wherein said time measuring step d) is performed by counting cycles of a reference clock signal (Clk) for measuring said time durations (T4, T5).

4. The method of claim 1, wherein said time measuring step d) is performed by allocating a number of said scanned values (X") to each of said amplitude changes (X4, X5) and deriving time durations (T4, T5) from said allocated number of scanned values.

5. The method of claim 1, wherein said scanning step a) is performed by scanning at least one telegram of said received amplitude modulated time signals, and predetermining a number of scanned values depending on said telegram of said received, amplitude modulated time signals (X).

6. The method of claim 1, wherein said predetermine time duration (Δt) is determined depending on a telegram of any one of said received, amplitude modulated time signals (X).

7. The method of claim 6, wherein said predetermined time duration (Δt), during which said first shorter amplitude changes are excluded from demodulation, is dependent on a smallest duration (T1) of an encoding amplitude change (X1) of said time signals (X) as predetermined by a respective time signal telegram.

8. The method of claim 1, further comprising gating out and excluding from said demodulating detected amplitude changes (X4, X5) which are maximally equal to 50% of a minimal time duration (T1) of a respective encoding amplitude change (X1) predetermined by a respective time signal telegram.

9. The method of claim 8, wherein any detected amplitude changes (X4, X5) having a duration (T4, T5) of maximally 25% of said minimal time duration (t1) are gated out and excluded form said demodulating.

10. The method of claim 1, further comprising selecting said predetermined time duration (Δt) to be maximally any one of 25 msec and 50 msec.

11. The method of claim 1, wherein said demodulating step is performed on stored scanned values corresponding to said second longer amplitude changes (X4, X5).

12. The method of claim 1, further comprising selecting for said demodulating step amplitude changes represented by stored scanned values occurring immediately prior to said first shorter amplitude changes that will be excluded from said demodulating.

13. The method of claim 1, further comprising providing said time information in bit-by-bit fashion in said time signal (X), allocating at least one data bit to each time frame (Y1-Y3), said at least one data bit having a logic value determined by time durations (T1-T3) of said amplitude changes (X1-X3), wherein a first duration (T1) of an amplitude change (X1) of said time signal (X) corresponds to a first logic value of said at least one data bit and wherein a second duration (T2) of a further amplitude change (X2) corresponds to a second logic value of said at least one data bit.

14. The method of claim 13, wherein said first logic value is a logic zero (“0”) and said second logic value is a logic one (“1”).

15. The method of claim 1, wherein said amplitude changes (X1-X3) of said time signal (X) are amplitude reductions of the time signal (X).

16. The method of claim 1, comprising performing said steps a) to f) in response to amplitude changes from a logic high value to a logic low value and vice versa.

17. The method of claim 16, further comprising allocating a first value for any one of said predetermined time duration (Δt) and a predetermined number of said scanned values for detected amplitude changes (X4, X5) having a transition from a high logic level to a low logic level, and allocating a second value for any one of said predetermined time duration (Δt) and a predetermined number of scanned values for detecting amplitude changes (X4, X5) having a transition from a low logic level to a high logic level.

18. The method of claim 1, further comprising determining for certain stored time signal telegrams an individual value or set of values including any one of said predetermined time duration (Δt) and a predetermined number of said scanned values, storing said individual value or set of values in said memory and excluding detected amplitude changes (X4, X5) in said certain stored time signal telegrams from said demodulation in accordance with said individual value or set of values.

19. A receiver circuit (5) for gaining time information from time signals (X) transmitted by a time signal transmitter (3), said receiver circuit comprising a scanner (7) for scanning received time signals (X), an evaluation unit (20) comprising a first section connected to said scanner (7) for detecting amplitude changes (X4, X5) in a scanned time signal (X"), and a second evaluation section, a counter operatively connected (at 18) to said second evaluation section for measuring a time duration (T4, T5) of said amplitude changes (X4, X5) of said scanned time signals (X"), said second evaluation section comprising a comparator for comparing said measured time duration (T4, T5) with a predetermined time duration (Δt) to exclude amplitude changes which are shorter in duration than said predetermined time duration (Δt) from further processing.

20. The receiver circuit of claim 19, further comprising a clock signal generator (10) operatively connected to said counter for counting clock signal cycles during said time durations (T4, T5) of said amplitude changes (X4, X5), whereby a count provides a measure for said time durations (T4, T5).

21. The receiver circuit of claim 19, further comprising a memory (21) for storing at least one time signal telegram of at least one time signal transmitter.

22. The receiver circuit of claim 19, wherein said memory comprises storage space for storing, in addition to said time signal telegram, a predetermined number of scanned values required for a demodulation of said time signal.

23. The receiver circuit of claim 22, wherein said storage space of said memory is sufficient for storing a number of scanned values which are required for any one of at least said predetermined time durations (Δt) and a predetermined number of scanned values of said amplitude changes.

24. The receiver circuit of claim 19, wherein any one of said evaluation unit (20) and said counter (22) is part of a logic circuit.

25. The receiver circuit of claim 24, wherein said logic circuit is a hardwired logic circuit.

26. The receiver circuit of claim 21, wherein any one of said evaluation unit (20) and said memory (21) is part of a demodulator (4) for demodulating received time signals.

27. A radio-controlled clock comprising a receiver circuit including a scanner (7) for scanning received time signals (X), an evaluation unit (20) comprising a first section connected to said scanner (7) for detecting amplitude changes (X4, X5) in a scanned time signal (X") and a second evaluation section, a counter operatively connected to said second evaluation section for measuring a time duration (T4, T5) of said amplitude changes (X4, X5) of said scanned time signals (X"), said second evaluation section comprising a comparator for comparing said measured time duration with a predetermined time duration (Δt) to exclude amplitude changes which are shorter in duration than said predetermined time duration (Δt) from further processing.

* * * * *